United States Patent
Uchino et al.

(10) Patent No.: US 11,064,554 B2
(45) Date of Patent: Jul. 13, 2021

(54) RADIO COMMUNICATION DEVICE AND RADIO COMMUNICATION METHOD

(71) Applicant: NTT DOCOMO, INC., Tokyo (JP)

(72) Inventors: Tooru Uchino, Tokyo (JP); Wuri Andarmawanti Hapsari, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 7 days.

(21) Appl. No.: 16/068,426

(22) PCT Filed: Dec. 28, 2016

(86) PCT No.: PCT/JP2016/089016
§ 371 (c)(1),
(2) Date: Jul. 6, 2018

(87) PCT Pub. No.: WO2017/119377
PCT Pub. Date: Jul. 13, 2017

(65) Prior Publication Data
US 2019/0037632 A1  Jan. 31, 2019

(30) Foreign Application Priority Data
Jan. 8, 2016 (JP) .............................. JP2016-002932

(51) Int. Cl.
*H04W 28/06* (2009.01)
*H04W 74/08* (2009.01)
(Continued)

(52) U.S. Cl.
CPC ........... *H04W 76/25* (2018.02); *H04W 28/06* (2013.01); *H04W 74/0833* (2013.01);
(Continued)

(58) Field of Classification Search
CPC . H04W 28/06; H04W 74/0833; H04W 76/19; H04W 76/20; H04W 76/25; H04W 76/27; H04W 80/02
See application file for complete search history.

(56) References Cited

U.S. PATENT DOCUMENTS

| 7,463,891 | B2 * | 12/2008 | Yi ........................ | H04W 76/10 455/450 |
| 8,682,283 | B2 * | 3/2014 | Kodali .................. | H04W 76/18 455/404.1 |

(Continued)

FOREIGN PATENT DOCUMENTS

JP  2003-078581 A  3/2003

OTHER PUBLICATIONS

International Search Report issued in PCT/JP2016/089016 dated Feb. 7, 2017 (2 pages).

(Continued)

*Primary Examiner* — Alpus Hsu
(74) *Attorney, Agent, or Firm* — Osha Bergman Watanabe & Burton LLP

(57) ABSTRACT

To provide a radio communication device and a radio communication method that can surely avoid a state that communication cannot be started because of a disagreement in states in an intermediate layer, which is lower to RRC layer, when transitioning between a connected state (RRC-Connected) and a suspended state (RRC-Suspended) in the RRC layer. UE (100) includes a state controlling unit (120) that controls the RRC layer to be in the connected state or the suspended state, and an interruption processing unit (130) that initializes at least a part of states in the intermediate layer, specifically MAC layer/RLC layer/PDCP layer, after the RRC layer has transitioned from the connected state to the suspended state. The state controlling unit (120) causes the RRC layer to resume from the suspended state to
(Continued)

the connected state based on the state of the intermediate layer initialized by the interruption processing unit (130).

7 Claims, 5 Drawing Sheets

(51) Int. Cl.
  *H04W 76/25* (2018.01)
  *H04W 76/27* (2018.01)
  *H04W 80/02* (2009.01)
  *H04W 76/20* (2018.01)
  *H04W 76/19* (2018.01)

(52) U.S. Cl.
  CPC .......... *H04W 76/19* (2018.02); *H04W 76/20* (2018.02); *H04W 76/27* (2018.02); *H04W 80/02* (2013.01)

(56) References Cited

U.S. PATENT DOCUMENTS

| | | | | |
|---|---|---|---|---|
| 8,958,289 | B2* | 2/2015 | Lee | H04W 76/38 370/228 |
| 9,118,452 | B2* | 8/2015 | Park | H04L 5/001 |
| 9,155,121 | B2* | 10/2015 | Rayavarapu | H04W 76/19 |
| 9,247,575 | B2* | 1/2016 | Rayavarapu | H04W 76/19 |
| 9,258,839 | B2* | 2/2016 | Rayavarapu | H04W 76/19 |
| 9,295,095 | B2* | 3/2016 | Rayavarapu | H04W 76/27 |
| 9,332,473 | B2* | 5/2016 | Yamada | H04W 24/04 |
| 9,363,694 | B2* | 6/2016 | Su | H04W 24/08 |
| 9,374,769 | B2* | 6/2016 | Kherani | H04W 48/16 |
| 9,504,081 | B2* | 11/2016 | Anderson | H04W 76/38 |
| 9,596,701 | B2* | 3/2017 | Park | H04L 5/001 |
| 9,686,736 | B2* | 6/2017 | Baratam | H04W 68/00 |
| 9,736,727 | B2* | 8/2017 | Nagasaka | H04W 36/22 |
| 9,854,566 | B2* | 12/2017 | Jung | H04W 76/14 |
| 10,123,370 | B2* | 11/2018 | Jung | H04W 76/14 |
| 10,149,221 | B2* | 12/2018 | Kim | H04W 36/30 |
| 10,154,530 | B2* | 12/2018 | Jung | H04W 76/14 |
| 10,292,200 | B2* | 5/2019 | Jung | H04W 76/27 |
| 2003/0007642 | A1 | 1/2003 | Jiang et al. | |
| 2013/0039287 | A1* | 2/2013 | Rayavarapu | H04W 68/005 370/329 |
| 2014/0080479 | A1 | 3/2014 | Vangala et al. | |
| 2015/0009874 | A1* | 1/2015 | Edara | H04W 52/0225 370/311 |
| 2015/0244429 | A1* | 8/2015 | Zhang | H04B 7/024 370/329 |
| 2016/0212638 | A1* | 7/2016 | Jain | H04W 48/20 |

OTHER PUBLICATIONS

Written Opinion of the International Searching Authority issued in PCT/JP2016/089016 dated Feb. 7, 2017 (4 pages).
3GPP TR 23.720 V1.2.0; "3rd Generation Partnership Project; Technical Specification Group Services and System Aspects; Architecture enhancements for Cellular Internet of Things (Release 13)"; Nov. 2015 (96 pages).
NTT Docomo, Inc.; "UP modelling for U-plane solution"; 3GPP TSG-RAN WG2 NB-IoT Ad-hoc Meeting, R2-160526; Budapest, Hungary; Jan. 19-21, 2016 (5 pages).
NTT Docomo, Inc.; "UP modelling for U-plane solution"; 3GPP TSG-RAN WG2 Meeting #93, R2-161332, St. Julian's, Malta; Jan. 19-21, 2016 (5 pages).
NTT Docomo, Inc.; "UP modelling for U-plane solution"; 3GPP TSG-RAN WG2 Meeting #93bis, R2-162578; Dubrovnik, Croatia; Apr. 11-15, 2016 (5 pages).
NTT Docomo, Inc.; "UP modelling for U-plane solution"; 3GPP TSG-RAN WG2 Meeting #93bis, R2-162485; Dubrovnik, Croatia; Apr. 11-15, 2016 (5 pages).
Extended European Search Report issued in counterpart European Patent Application No. 16883876.1, dated Sep. 9, 2019 (6 Pages).
Ericsson; "Further updates to solution 6.5"; SA WG2 Meeting #111, S2-153179; Oct. 19-23, 2015, Chengdu, P.R. China (6 Pages).
Ericsson; "Signaling reduction for UE state transitions"; SA WG2 Meeting #110, S2-152667; Jun. 6-10, 2015, Dubrovnik, Croatia (7 Pages).
HTC; "RRC aspects in NB-IoT"; 3GPP TSG-RAN2 Meeting #92, R2-156425; Nov. 16-20, 2015, Anaheim, USA (19 Pages).
Office Action issued in the counterpart Brazilian Patent Application No. BR112018013613-1, dated Sep. 24, 2020 (6 pages).
Office Action issued in the counterpart Japanese Patent Application No. 2017-560366, dated Sep. 15, 2020 (8 pages).
3GPP TS 36.300 V12.8.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overal description; Stage 2 (Release 12)"; Dec. 2015 (22 pages).
Office Action issued in counterpart Japanese Patent Application No. 2017-560366 dated Mar. 2, 2021 (7 pages).

* cited by examiner

FIG. 1
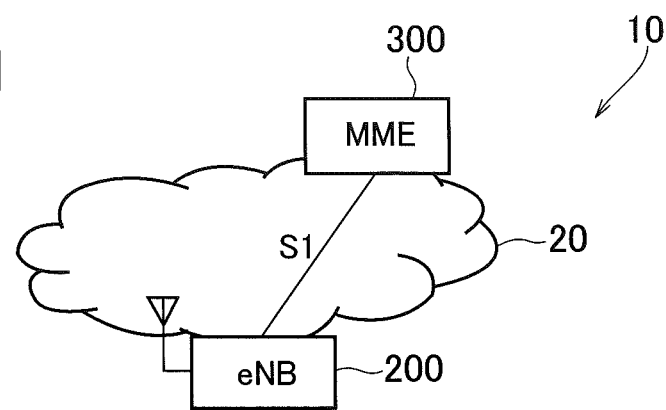
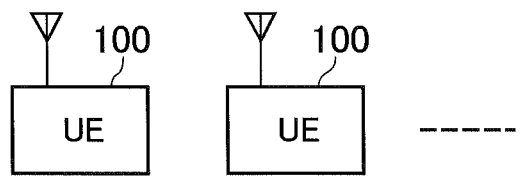
FIG. 2
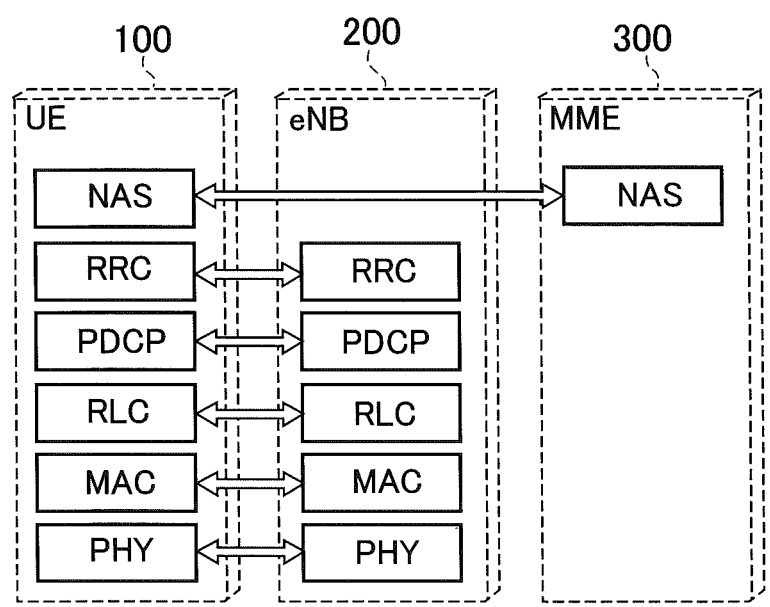

RADIO COMMUNICATION DEVICE AND RADIO COMMUNICATION METHOD

TECHNICAL FIELD

The present invention relates to a radio communication device and a radio communication method capable of transitioning between a connected state and a suspended state in a radio resource control layer.

BACKGROUND ART

3rd Generation Partnership Project (3GPP) specifies Long Term Evolution (LTE), and with the aim of further speeding, specifies the LTE including LTE-Advanced (hereinbelow, the LTE includes the LTE-Advanced).

In the LTE, a user device (UE) transitions between an idle state (RRC-Idle) and a connected state (RRC-Connected) in a radio resource control layer (RRC layer) depending on the presence or absence of transmitted and received data in the user plane (U plane). However, if the UE switches frequently between the RRC-Idle and the RRC-Connected, signaling relating to a call control in a control plane (C plane) increases. There is a need to reduce such a signaling.

Particularly, in the case of UE (MTC-UE) for Machine Type Communication (MTC), because the amount of transmitted and received data in the U plane is small, the amount of signaling data relating to the call control is relatively high. Therefore, there is a strong need to reduce the signaling also from the viewpoint of transmission efficiency.

To address this issue, in the LTE, while maintaining a connection (S1 connection) for UE between a radio base station (eNB) and Mobility Management Entity (MME), RRC-Suspended (and ECM-Suspended in Non-Access Stratum (NAS) layer) that is a suspended state in which a connection in the RRC layer is made open is being considered (See Non-Patent Document 1).

In this technique, the UE transitions from the RRC-Connected to the RRC-Suspended (RRC Suspend), and resumes (RRC Resume) from the RRC-Suspended to the RRC-Connected depending on requirement of data transmission and reception. Moreover, like the UE, the eNB also transitions from the RRC-Connected to the RRC-Suspended and resumes to the RRC-Connected from the RRC-Suspended.

PRIOR ART DOCUMENT

Non-Patent Document

[Non-Patent Document 1]: 3GPP TR 23.720 V1.2.0, 3rd Generation Partnership Project; Technical Specification Group Services and System Aspects; Architecture enhancements for Cellular Internet of Things (Release 13), 3GPP, November 2015

SUMMARY OF THE INVENTION

As mentioned above, when the UE and the eNB (radio communication device) transition between the RRC-Connected and the RRC-Suspended, there is a concern about the following issues. That is, the operation in a layer that is lower to the RRC layer is not clear when the UE and the eNB transition between the RRC-Connected and the RRC-Suspended. Specifically, the operation in a medium access control layer (MAC layer), a radio link control layer (RLC layer), and the packet data convergence protocol layer (PDCP layer) is not clear.

Therefore, after the UE and the eNB have resumed to the RRC-Connected from the RRC-Suspended, a disagreement in states can occur between the UE and the eNB in those layers (collectively called intermediate layers, or so-called layer 2). When such a disagreement in states occurs, even if the UE and the eNB resume to the RRC-Connected, there is a possibility that communication such as data transmission and reception cannot be started normally.

The present invention has been made in view of the above discussion. One object of the present invention is to provide a radio communication device and a radio communication method that can surely avoid a state that communication cannot be started because of a disagreement in states in an intermediate layer, which is lower to RRC layer, when transitioning between a connected state (RRC-Connected) and a suspended state (RRC-Suspended) in the RRC layer.

A radio communication device according to one aspect of the present invention includes a physical layer, a radio resource control layer, an intermediate layer located between the physical layer and the radio resource control layer, and is capable of transitioning between a connected state in the radio resource control layer and a suspended state in the radio resource control layer. The radio communication device includes a state controlling unit that controls the radio resource control layer to be in any one of the connected state and the suspended state; and an interruption processing unit that initializes at least a part of states in the intermediate layer after the radio resource control layer has transitioned from the connected state to the suspended state. The state controlling unit causes the radio resource control layer to resume from the suspended state to the connected state based on the state of the intermediate layer initialized by the interruption processing unit.

A radio communication method according to another aspect of the present invention includes a physical layer, a radio resource control layer, an intermediate layer located between the physical layer and the radio resource control layer, and is capable of transitioning between a connected state in the radio resource control layer and a suspended state in the radio resource control layer. The radio communication method includes transitioning the radio resource control layer from the connected state to the suspended state; initializing at least a part of states in the intermediate layer; and causing the radio resource control layer to resume from the suspended state to the connected state based on the initialized state of the intermediate layer.

BRIEF DESCRIPTION OF DRAWINGS

FIG. 1 is an overall structural diagram of a radio communication system 10.

FIG. 2 depicts a protocol stack mounted in UE 100, eNB 200, and MME 300.

MODES FOR CARRYING OUT THE INVENTION

Figure 3:
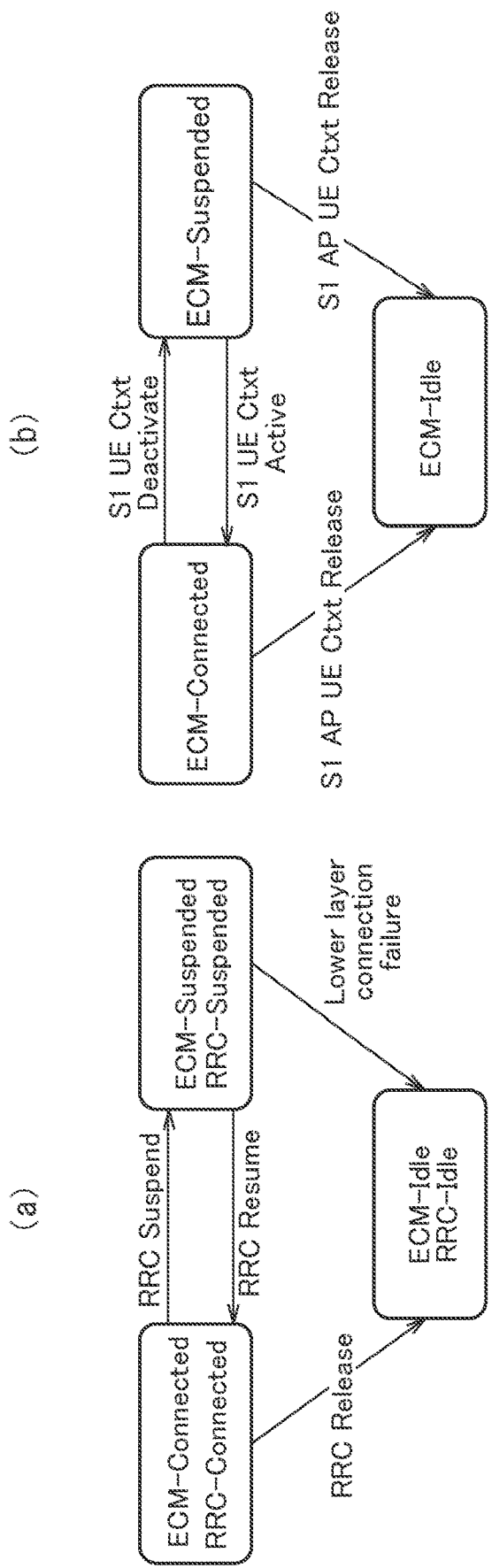
FIG. 3 is a state transition diagram of the UE 100 and the MME 300.

Exemplary embodiments are explained below with reference to the accompanying drawings. In the drawings, structural elements having the same function or configuration are indicated by the same or similar reference numerals and the explanation thereof is appropriately omitted.

(1) Overall Structural Configuration of Radio Communication System

FIG. 1 is an overall structural diagram of a radio communication system 10 according to the present embodiment. The radio communication system 10 is a radio communication system in accordance with Long Term Evolution (LTE). The radio communication system 10 includes a radio access network 20 and a user device 100 (hereinafter, "UE 100").

The radio access network 20 is Evolved Universal Terrestrial Radio Access Network (E-UTRAN) stipulated in 3GPP. The radio access network 20 includes a radio base station 200 (hereinafter, "eNB 200") and a mobility management entity 300 (hereinafter, "MME 300").

However, the radio communication system 10 is not necessarily limited to the LTE (E-UTRAN). For example, the radio access network 20 can be a radio access network including a radio base station that performs radio communication with a user device stipulated as 5G.

The UE 100 and the eNB 200 perform radio communication in accordance with the specification of the LTE. Specifically, each of the UE 100 and the eNB 200 is provided with a protocol stack in accordance with the specification of the LTE and performs the radio communication.

The UE 100 and the eNB 200 constitute a radio communication device according to the present embodiment. The type of the UE 100 is not particularly limited. For example, the UE 100 can be UE (MTC-UE) for Machine Type Communication (MTC).

The MME 300 manages a plurality of the eNBs 200 that constitute the radio access network 20, and it is a logical node (device) that performs a mobility control and the like of the UE 100. That is, the MME 300 manages the mobility of the UE 100.

FIG. 2 depicts a protocol stack mounted in the UE 100, the eNB 200, and the MME 300. Specifically, FIG. 2 shows the protocol stack of a control plane (C plane).

As shown in FIG. 2, the UE 100 includes a physical layer (PHY layer), a medium access control layer (MAC layer), a radio link control layer (RLC layer), a packet data convergence protocol layer (PDCP layer), a radio resource control layer (RRC layer), a non-access stratum layer (NAS layer).

The MAC layer, the RLC layer, and the PDCP layer are the protocols belonging to the so-called layer 2 located between the PHY layer and the RRC layer, and constitute intermediate layers in the present embodiment. FIG. 2 shows the protocol stack of the C plane; however, a protocol stack of the user plane (U plane) is similar to the protocol stack of the C plane except that the RRC layer and the NAS layer are absent.

The eNB 200 includes all the layers of the UE 100 except the NAS layer. Each layer of the eNB 200 opposes a corresponding layer of the UE 100.

The MME 300 includes the NAS layer. The NAS layer of the MME 300 opposes the NAS layer of the UE 100.

The UE 100 and the eNB 200 according to the present embodiment can transition to RRC-Suspended (and to ECM-Suspended in the NAS layer) that is the suspended state in which a connection in the RRC layer is released. The suspended state can be defined as a state that does not belong to either the connected state or an idle state. Alternatively, the suspended state can be defined as a state (sub-state) that belongs either to the connected state or the idle state.

FIGS. 3(a) and 3(b) depict state transition diagrams of the UE 100 and the MME 300. Specifically, FIG. 3(a) depicts a state transition diagram of RRC and ECM in the UE 100. FIG. 3(b) depicts a state transition diagram of the ECM in the MME 300.

As shown in FIG. 3(a), in the RRC-Connected (ECM-Connected) that is the connected state in the RRC layer (and the NAS layer, the same holds true in the following description), the UE 100 transitions to the RRC-Suspended (ECM-Suspended), which is the suspended state in which the connection in the RRC layer is released, by performing RRC Suspend. The UE 100 resumes to the RRC-Connected (ECM-Connected) by performing RRC Resume in the RRC-Suspended.

When the transmitted and received data in the U plane does not exist for a certain period of time, the UE 100 transitions from the RRC-Connected (ECM-Connected) to the RRC-Suspended (ECM-Suspended). For example, in the eNB 200, the time elapsed from a time point at which U plane data occurred last (or transmission and reception, or scheduling of the U plane data is performed last) is measured for every user (UE 100), and an instruction signal instructing to transition to the RRC-Suspended (ECM-Suspended) state can be transmitted from the eNB 200 to the UE 100 when the measured time exceeds a threshold value.

Alternatively, the time elapsed from a time point at which the U plane data occurred last (or transmission and reception, or scheduling of the U plane data is performed last) is measured in the UE 100, and the UE 100 can autonomously transition to the RRC-Suspended (ECM-Suspended) state when the measured time exceeds a threshold value.

In the above case, an agreement can be established in the states of the UE 100 and the eNB 200 by performing the similar measurement even on the eNB 200 side. The measurement of the time is not limited to the U plane, but can be measured in C plane signal other than the instruction signal instructing to transition the RRC state such as RRC release and the RRC-Suspended, or can be measured in PDU and the like in any of the layers.

The UE 100, when in the RRC-Connected (ECM-Connected), transitions to the RRC-Idle (ECM-Idle), which is the idle state in the RRC layer, by performing the RRC Release. Furthermore, the UE 100, when in the RRC-Suspended (ECM-Suspended), transitions to the RRC-Idle (ECM-Idle) when a connection disorder occurs in the lower layer (Lower layer connection failure).

As shown in FIG. 3(b), the MME 300 transitions to the ECM-Suspended by performing S1 UE Ctxt Deactivate when in the ECM-Connected that is the connected state in the NAS layer. Moreover, the MME 300 resumes to the ECM-Connected by performing S1 UE Ctxt Active in the ECM-Suspended.

The MME 300 transitions to the ECM-Idle by performing S1AP UE Ctxt Release in the ECM-Connected. Furthermore, the MME 300 transitions to the ECM-Idle by performing the S1AP UE Ctxt Release in the ECM-Suspended.

As shown in FIGS. 3(a) and 3(b), although the state transition of the UE 100 and the MME 300 can be performed, in the RRC-Suspended (ECM-Suspended), S1 connection for the UE 100 between the eNB 200 and the MME 300, specifically, S1-U (U plane) and S1-C(C plane) connections are maintained in the connected state without being released.

(2) Functional Block Configuration of Radio Communication System

Figure 4:
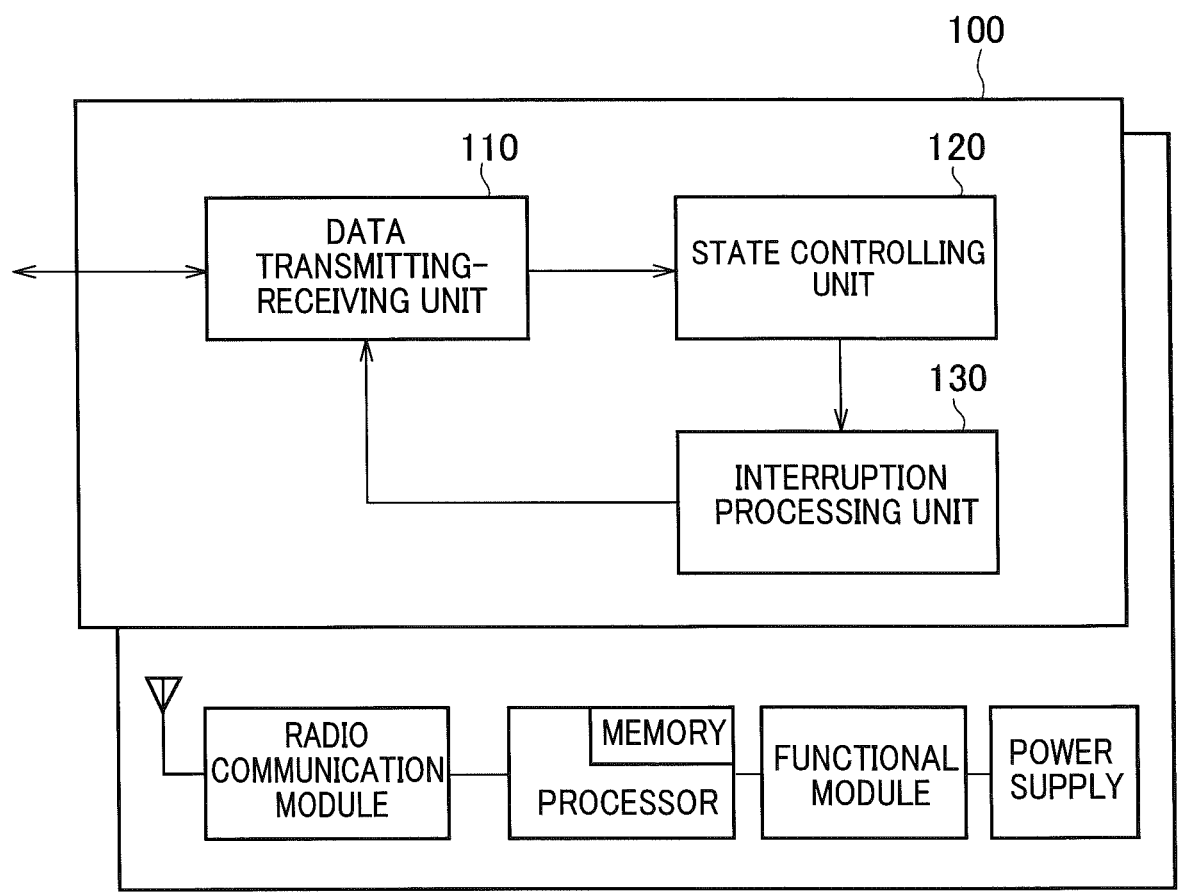
FIG. 4 is a functional block diagram of the UE 100.

A functional block configuration of the radio communication system 10 is explained below. Specifically, a functional block configuration of the UE 100 is explained below. FIG. 4 is a functional block diagram of the UE 100.

As shown in FIG. 4, the UE 100 includes a data transmitting-receiving unit 110, a state controlling unit 120, and an interruption processing unit 130.

As shown in FIG. 2, each functional block of the UE 100 is implemented by a hardware element such as a radio communication module, a processor (including a memory), a functional module (external connection IF, position detection, various measurement, and the like) and a power supply (such as a battery). The eNB 200 also has a similar functional block configuration as the UE 100.

The data transmitting-receiving unit 110 performs transmission and reception of data via a radio bearer and the like set between the eNB 200. Specifically, the data transmitting-receiving unit 110 transmits and receives the data of the C plane and the U plane according to the operation of each layer in the protocol stack shown in FIG. 2.

The state controlling unit 120 controls the connected state with the radio access network 20 of the UE 100, specifically, the connected state with the eNB 200.

More specifically, the state controlling unit 120 controls the RRC layer so as to be in the connected state (RRC-Connected) or in the suspended state (RRC-Suspended). Moreover, the state controlling unit 120 causes the RRC layer to resume from the suspended state to the connected state based on the state of an intermediate layer, that is, the MAC layer, the RLC layer, and the PDCP layer, that has been initialized by the interruption processing unit 130.

After the state of the UE 100 with the eNB 200 has transitioned from the connected state to the suspended state, the interruption processing unit 130 performs an interruption process prescribed beforehand, or an interruption process based on the contents of an instruction received from the radio access network 20 (eNB 200).

Specifically, after the RRC layer has transitioned from the connected state (RRC-Connected) to the suspended state (RRC-Suspended), the interruption processing unit 130 can initialize at least a part of the states of the intermediate layer.

That is, after the UE 100 has transitioned to the RRC-Suspended, the interruption processing unit 130 can initialize a part of the states of the intermediate layer or can initialize all of the states.

More specifically, the interruption processing unit 130 can initialize a timer value and a variable value in the intermediate layer. The initialization of the timer value includes resetting the values of the various timers operating in the MAC layer, the RLC layer, and the PDCP layer.

The variable that can be initialized, can include, for example, in the MAC layer, a back-off timer value (TS36.321 Chapter 7.2) used when triggering the next RA preamble transmission in case of a failure of RA procedure. In the RLC layer, the variable can be values (TS36.322 Chapter 7.1) indicating a top edge and a bottom edge of a transmission window (or a reception window) of RLC. In the PDCP layer, the variable can be COUNT value that is proposed to be allocated to the next PDCP SDU at the transmission side, or can be a sequence number and a hyper frame number (Hyper frame number) (TS36.323 Chapter 7.1) of PDCP PDU that is expecting the next reception at the reception side.

The interruption processing unit 130 can initialize a random access procedure (RA procedure) performed in the MAC layer. That is, after resuming to the RRC-Connected, the interruption processing unit 130 causes the RA procedure to be performed once again to initialize the RA procedure.

The interruption processing unit 130 can initialize the contents of the protocol data unit processed in the RLC layer. Specifically, the interruption processing unit 130 initializes the contents of RLC control PDU. The interruption processing unit 130 can initialize the information used for controlling the RLC layer without limiting only to the RLC control PDU.

Furthermore, the interruption processing unit 130 can initialize the contents of the protocol data unit processed in the PDCP layer. Specifically, the interruption processing unit 130 can initialize the contents of PDCP control PDU. The interruption processing unit 130 can initialize the information used for controlling the PDCP layer without limiting only to the PDCP control PDU.

The interruption processing unit 130 can maintain a context of header compression processed in the PDCP layer without initializing. Specifically, after the UE 100 has transitioned to the RRC-Suspended, the interruption processing unit 130 maintains the context to the context when the transition was made without initializing the context of Robust Header Compression (See ROHC, RFC3085) that is a header compression protocol used in the PDCP layer.

Although different from the interruption process explained above, after the UE 100 has transitioned to the RRC-Suspended, the interruption processing unit 130 can maintain all the states in the intermediate layer without initializing.

(3) Operation of Radio Communication System

An operation of the radio communication system 10 is explained below. Specifically, an operation by which the UE 100 transitions from the RRC-Connected to the RRC-Suspended and resumes from the RRC-Suspended to the RRC-Connected is explained. The eNB 200 also performs almost a similar operation as that of the UE 100.

(3.1) Operation Example 1

Figure 5:
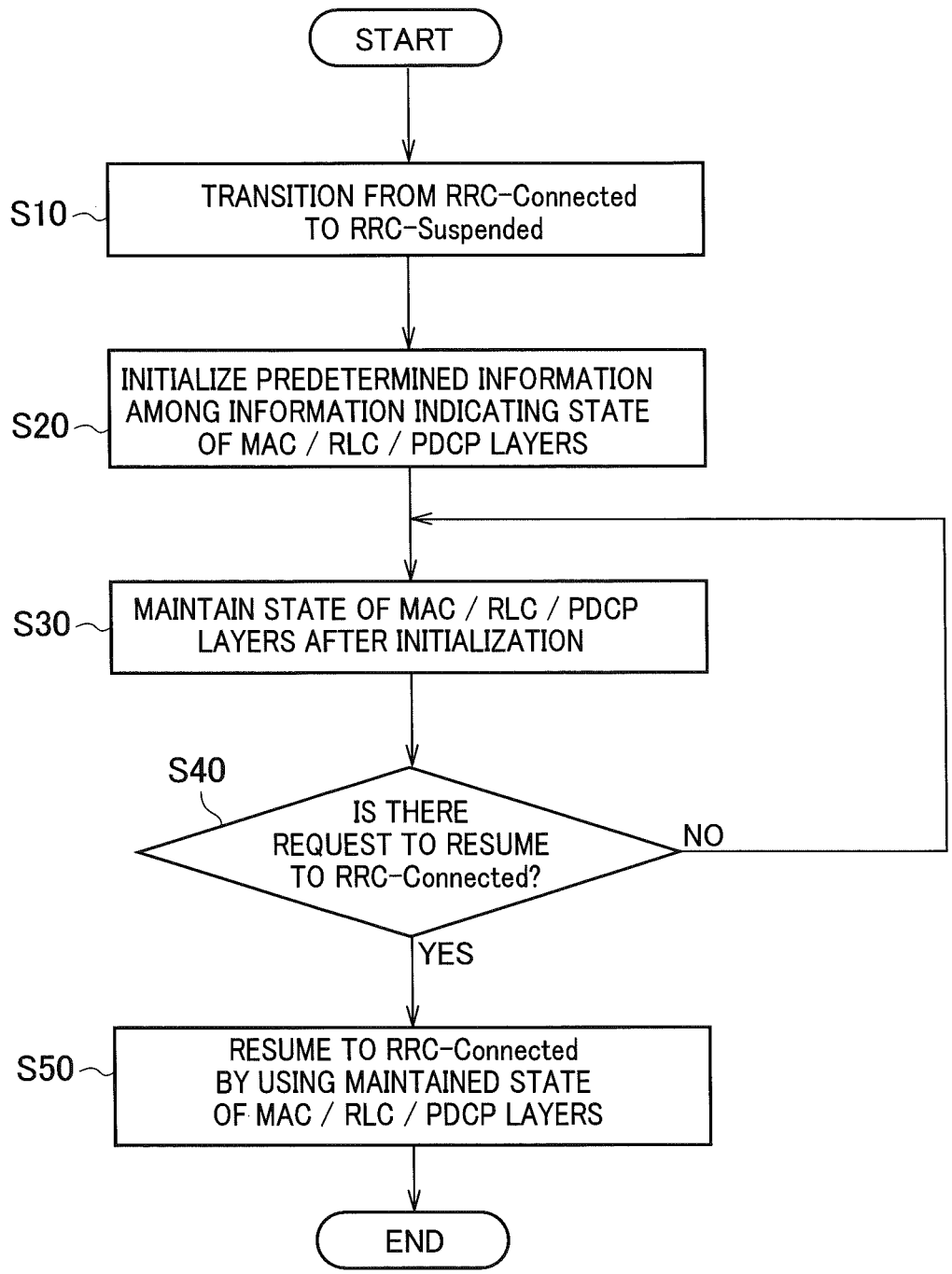
FIG. 5 is a flowchart of an operation (operation example 1) performed when the UE 100 transitions between RRC-Connected and RRC-Suspended.

FIG. 5 is a flowchart of an operation (operation example 1) performed when the UE 100 transitions between the RRC-Connected and the RRC-Suspended.

In the operation example 1, after the UE 100 has transitioned to the RRC-Suspended, only a subject state is initialized while maintaining a part of information in the intermediate layer, that is, while maintaining a part of the states of the intermediate layer to the states thereof at the time the transition was made to the RRC-Suspended.

As shown in FIG. 5, the UE 100 transitions from the RRC-Connected to the RRC-Suspended (S10). As mentioned above, as a typical example of transitioning to the RRC-Suspended, a case in which the transmitted and received data in the U plane does not exist for a certain period of time can be listed.

The UE 100 initializes predetermined information among the information indicating the state of the intermediate layer, that is, the MAC layer, the RLC layer, and the PDCP layer (S20).

Specifically, the UE 100 performs an interruption process explained below for each layer. At first, in the MAC layer, the information for which there may be a possibility of occurrence of a state disagreement between the UE 100 and the eNB 200 in the RRC Resume is initialized. For example, a timer value used in the MAC layer and the RA procedure are initialized.

On the other hand, in the MAC layer, the UE 100 maintains, without initializing, the information for which there is a possibility that the information may be valid even at the time of the RRC Resume.

As an example of such information, for example, the information indicating the internal state of the UE 100, such as Buffer Status Report (BSR) that indicates a state of the buffer, and Power Head Room (PHR) that indicates the surplus energy of the transmitted power in the UE 100, can be listed. To more specifically exemplify the internal state of the UE 100, the UE 100 maintains the fact that it is the triggered state when the transition to the RRC-Suspended has been performed in a state in which a predetermined process has been triggered. Alternatively, starting/expiration state of each timer, or a value of Path loss or Power back off at the current time point, that is used for a report trigger of the PHR, may be maintained.

The UE 100 may maintain data stored in HARQ buffer (may be called a soft buffer) of uplink and downlink.

Then, in the RLC layer as well, the information for which there may be a possibility of occurrence of a state disagreement between the UE 100 and the eNB 200 in the RRC Resume is initialized. For example, the information used to control the RLC layer, such as a timer value and the RLC control PDU used in the RLC layer, is initialized.

On the other hand, in the RLC layer, the UE 100 maintains, without initializing, the information for which there is a possibility that the information may be valid even at the time of the RRC Resume.

As an example of such information, uplink RLC SDU (or RLC PDU) that has not received ACK can be listed. If similar security context is used also at the time of the RRC Resume, by transmitting the RLC SDU to the eNB 200 after the RRC Resume, it can be considered that the eNB 200 accepts the RLC SDU.

Furthermore, in the PDCP layer as well, the information for which there may be a possibility of occurrence of a state disagreement between the UE 100 and the eNB 200 in the RRC Resume is initialized. For example, the information used to control the PDCP layer, such as a timer value and the PDCP control PDU used in the PDCP layer, is initialized.

On the other hand, in the PDCP layer, the UE 100 maintains, without initializing, the information for which there is a possibility that the information may be valid even at the time of the RRC Resume.

As examples of such information, COUNT value of the PDCP, the PDCP SDU and the PDCP PDU present in a buffer of the PDCP layer, and information indicating header compression state (context of ROHC) can be listed.

The COUNT value of the PDCP includes a number (Hyper frame number) of a hyper frame and a sequence number (PDCP SN) of the PDCP PDU (or connected to the PDCP SDU). The COUNT value of the PDCP is used in the reception of the PDCP PDU in the downlink, in the transmission of the PDCP PDU in the uplink, and is used in a security processing in the C plane and the U plane.

In the ROHC, the transmitting side and the receiving side of IP packet maintain a change pattern of each header field of the IP packet, and compression and expansion of the header are realized by synchronizing the change pattern in the transmitting side and the receiving side.

Usually, the context of the ROHC is deleted after the radio bearer (PDCP entity) is released. Therefore, at the time of the RRC Resume, it is necessary to once again establish the context of the ROHC in the transmitting side and the receiving side to realize the header compression (note that, a non-compressed header is transmitted and received before establishment of the context). Therefore, by maintaining the context at the time of transitioning to the RRC-Suspended, it is not necessary to once again establish the context upon resuming to the RRC-Connected, so that the header compression can be started immediately.

The UE 100 may perform the operation of each layer at Step S20 based on an instruction from the eNB 200.

As mentioned earlier, the UE 100 that has initialized the predetermined information in the intermediate layer maintains the state of the intermediate layer (MAC layer/RLC layer/PDCP layer) after the initialization (S30).

When Step S30 is completed, the UE 100 periodically determines whether there is a resume request to resume from the RRC-Suspended to the RRC-Connected (S40). Transmission of the data in the U plane is a typical example in which a request to resume from the RRC-Suspended to the RRC-Connected is required.

When there is a resume request to resume to the RRC-Connected, the UE 100 resumes to the RRC-Connected by using the maintained state of the intermediate layer (MAC layer/RLC layer/PDCP layer) (S50).

Specifically, the UE 100 resumes to the RRC-Connected (and ECM-Connected) by performing the RRC Resume in the RRC-Suspended.

(3.2) Operation Example 2

In the operation example 2, all the states of the intermediate layer are initialized after the UE 100 has transitioned to the RRC-Suspended. The differences between the operation examples 1 and 2 are mainly explained below.

The flowchart shown in FIG. 5 can be used in the operation example 2 also. However, at Step S20, the UE 100 initializes predetermined information among the information indicating the state of the intermediate layer (MAC layer/RLC layer/PDCP layer), and the predetermined information is all the information in the intermediate layer.

In the present operation example, after transitioning to the RRC-Suspended, it is regarded that all the related radio connections are disconnected, and the MAC layer, the RLC layer, and the PDCP layer are once reset. However, the information required at the time of the RRC Resume is maintained. UE context corresponds to the information required at the time of the RRC Resume, and, for example, includes information included in RadioResourceConfigDedicated and security information required for the radio connection.

In this operation example, MAC reset is performed in the MAC layer thereby releasing associated MAC configuration. However, a configuration is allowable in which the MAC layer in itself autonomously releases the associated MAC configuration. Alternatively, a configuration is allowable in which the MAC layer releases the associated MAC configuration based on an instruction from an upper layer (e.g., RRC layer). The MAC reset follows the contents prescribed in 3GPP TS36.321.

A configuration is allowable in which the UE 100 maintains, without initializing, uplink resource, for example, PUCCH-SR (Scheduling Request), CQI (Channel Quality Indicator), and SRS (Sounding RS).

Conventionally, such individual resource is released with the MAC reset. Specifically, TA timer is considered to have expired with the MAC reset, and such expiration is notified from the MAC layer to the RRC layer. Accordingly, the RRC layer releases the individual resource in response to such a notification.

However, the UE 100 may perform the following operation to maintain the individual resource even if the MAC reset is performed. That is, even if the MAC reset is performed, the UE 100 does not consider that the TA timer has expired but simply stops the TA timer. Accordingly, the expiration is not notified from the MAC layer to the RRC layer either. Alternatively, it is allowable to have a configuration in which the RRC layer of the UE 100 ignores (deletes) the notification of the expiration from the MAC layer.

Subsequently, in the RLC layer, all the variables are initialized, and the timer is reset. Moreover, the UE 100 deletes all the RLC PDUs received from the eNB 200 or from the other UEs with which a direct communication is being performed. When processing is possible, the UE 100 can obtain the RLC SDU from the RLC PDU, and supply the obtained RLC SDU to the upper layer (PDCP layer).

Similarly, the UE 100 deletes all the RLC PDUs that were in transmission, or waiting for transmission, at the time of transition to the RRC-Suspended.

The initialization of the RLC layer can be realized by performing by using the conventional RLC Re-establishment process. Alternatively, the initialization can be realized by deletion and addition (removal and add) of RLC entity.

The UE 100 can perform such initialization process based on an instruction from the eNB 200. That is, like in the normal transition to the RRC-Idle, the RLC entity for which the initialization process has not been instructed can be released in the UE 100. Moreover, the instruction of the initialization by the eNB 200 can be made in QoS unit, a bearer unit, a logical channel (LCH) unit, a bearer group in which a plurality of bearers are grouped, or LCH group unit in which a plurality of the LCH are grouped.

Furthermore, all variables are initialized and the timer is reset even in the PDCP layer. Moreover, the UE 100 deletes all the PDCP PDUs received from the eNB 200 or from the other UEs with which a direct communication is being performed. Similarly, the UE 100 deletes all the PDCP PDUs that were in transmission, or waiting for transmission, at the time of transition to the RRC-Suspended.

Moreover, the initialization of the PDCP layer can be realized by performing by using the conventional PDCP Re-establishment process. Alternatively, the initialization can be realized by deletion and addition (removal and add) of the PDCP entity.

The UE 100 handles the initialization process in the PDCP layer in the same manner as that in the RLC layer. That is, the UE 100 can perform such initialization process based on an instruction from the eNB 200. Moreover, the instruction of the initialization can be made, like in the RLC layer, in the units of QoS or a bearer.

(3.3) Operation Example 3

Figure 6:
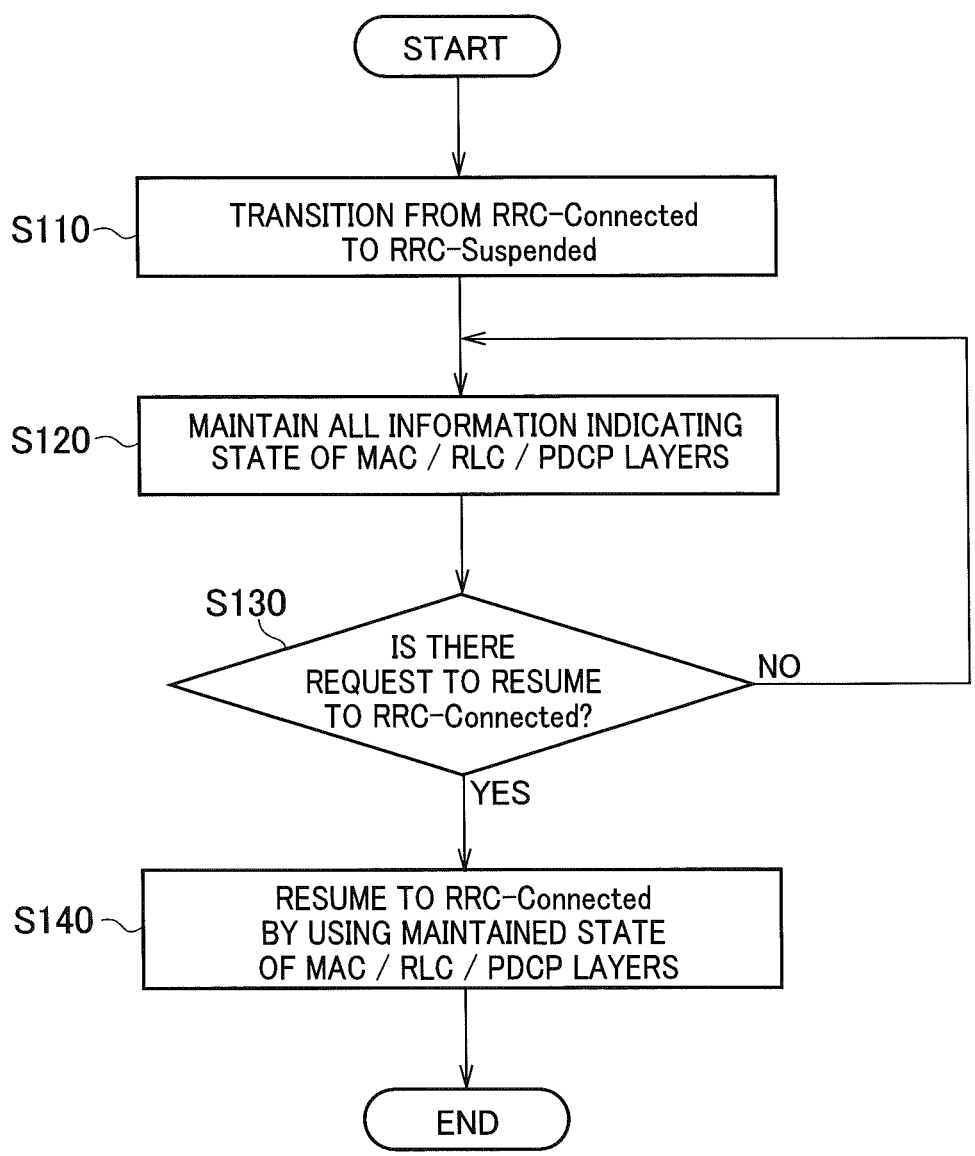
FIG. 6 is a flowchart of an operation (operation example 3) performed when the UE 100 transitions between RRC-Connected and RRC-Suspended.

FIG. 6 is a flowchart of an operation (operation example 3) performed when the UE 100 transitions between the RRC-Connected and the RRC-Suspended.

In the operation example 3, all the states of the intermediate layer are maintained after the UE 100 has transitioned to the RRC-Suspended. The differences between the operation examples 1 and 2, and the operation example 3 are mainly explained below.

The process at Step S110 in FIG. 6 is similar to the process at Step S10 in FIG. 5. That is, the UE 100 transitions from the RRC-Connected to the RRC-Suspended.

Upon transitioning to the RRC-Suspended, the UE 100 maintains all the information indicating the state of the intermediate layer, that is, the MAC layer, the RLC layer, and the PDCP layer (S120).

The processes at Steps S130 and S140 of FIG. 6 are similar to the processes at Steps S40 and S50 of FIG. 5.

Specifically, upon transitioning from the RRC-Connected to the RRC-Suspended because of the RRC Suspend, the UE 100 stops its operation while maintaining all the information of the intermediate layer. That is, in this operation example, unlike the operation example 1 and the operation example 2, the UE 100 maintains all the states of the intermediate layer which were just before transitioning to the RRC-Suspended.

Moreover, when resuming from the RRC-Suspended to the RRC-Connected because of the RRC Resume, the UE 100 restarts the communication in the same state that was before transitioning to the RRC-Suspended by using the maintained information of the intermediate layer.

Specifically, the timer that is running can be caused to operate until expiration thereof, and an event can be triggered after the expiration thereof. Alternatively, the timer that is running can be temporarily stopped at the value at the time point of the transition to the RRC-Suspended, and the timer can be restarted with this value as the initial value at the time point of resuming to the RRC-Connected.

On the other hand, in this operation example, the UE 100 performs the operation corresponding to that performed in the conventional RRC-Idle state when performing transmission and reception of the data in each layer. Accordingly, for example, the operation corresponding to an event is not performed even if some kind of event is triggered in each layer. A configuration is allowable in which the UE 100 deletes such an event, or maintains the event and performs the operation corresponding to the event after resuming to the RRC-Connected.

(4) Effects and Advantages

According to the present embodiment, the following effects and advantages can be obtained. Specifically, according to the operation example 1 and the operation example 2 explained above, the state controlling unit 120 causes the RRC layer to resume from the suspended state (RRC-Suspended) to the connected state (RRC-Connected) based on the state of the intermediate layer (MAC layer/RLC layer/PDCP layer) initialized by the interruption processing unit 130.

Therefore, the state of the intermediate layer can be caused to agree between the UE 100 and the eNB 200, and the state of the intermediate layer can be prevented from disagreeing between the UE 100 and the eNB 200 after the UE 100 has resumed from the RRC-Suspended to the RRC-Connected. As a result, it is possible to surely avoid a state that the communication cannot be started because of a disagreement in the states in the intermediate layer after resuming to the RRC-Connected.

Particularly, according to the operation example 1, in comparison to the operation example 2, a part of the states of the intermediate layer is initialized, and the other states are maintained as is, so that the connection delay occurring after resuming to the RRC-Connected because of the RRC Resume can be reduced.

On the other hand, the operation example 2 is a simple processing in which all the states of the intermediate layer are initialized, and, accordingly, the amount of information that is required to be maintained in the UE 100 and the eNB 200 can be reduced.

According to the operation example 3, in comparison to the operation example 1 and the operation example 2, the amount of information that is required to be maintained is more; however, the connection delay occurring after resuming to the RRC-Connected because of the RRC Resume is shorter, and many of the established operations can be used.

Furthermore, in the operation example 1, the timer value and the value of the variable in the intermediate layer are initialized. Moreover, in the operation example 1 the RA procedure is also initialized. Furthermore, in the operation example 1, the contents of the RLC control PDU and the PDCP control PDU are also initialized.

Therefore, after resuming to the RRC-Connected because of the RRC Resume, the information in which there is a possibility of occurrence of a state disagreement between the UE 100 and the eNB 200 is surely initialized. Accordingly, the state that the communication cannot be started after resuming to the RRC-Connected can be more surely avoided.

Moreover, in the operation example 1, the ROHC context in the PDCP layer is maintained without being initialized.

Therefore, it is not necessary to establish the context once again after resuming to the RRC-Connected, and the header compression can be started immediately. As a result, the connection delay occurring after resuming to the RRC-Connected because of the RRC Resume can be further reduced.

(5) Other Embodiments

The present invention has been explained in detail by using the above mentioned embodiments; however, it is self-evident to a person skilled in the art that the present invention is not limited to the embodiments explained herein and that the embodiments can be modified or improved in various ways.

For example, different operations can be performed in each of the MAC layer, the RLC layer, and the PDCP layer among those explained in the operation example 1 to the operation example 3. For example, the operations explained in the operation example 1 can be performed in the MAC layer, and, the operations explained in the operation example 3 can be performed in the PDCP layer.

Moreover, which operations are to be performed in which layer can be determined based on an instruction (for example, such instruction can be included in RRC Connection Release) from the radio access network 20 (eNB 200).

Furthermore, when this method is adopted, the UE 100 can notify the eNB 200 of the performed initialization or the maintained contents after resuming to the RRC-Connected because of the RRC Resume. For example, the UE 100 can notify such contents by using a message within the RA procedure, specifically, Msg1 (RA preamble) or Msg3.

When the Msg1 (RA preamble) is used, which RA preamble (PRACH) resource is to be used varies depending on a communication state between the UE 100 and the eNB 200, therefore, given contents can be notified depending on a use status of a given resource. The given resource can be orthogonal in terms of frequency/time, or can be distinguished by a preamble sequence.

When the Msg3 is used, the given contents can be notified by using an identifier (LCID) within a pay-load (CCCH) within the Msg3 or within MAC subheader.

Furthermore, the order of processes in the sequences, flow charts, and the like in the embodiment explained above can be reshuffled as long as the order is kept consistent across sequences and flows.

Moreover, the terminology explained in the present description and/or the terminology necessary for understanding the present description can be replaced with the terminology having the same or similar meanings. For example, terms "channel" and/or "symbol" can be replaced with the term "signal". Moreover, the term "signal" can be replaced with the term "message". Furthermore, the terms "system" and "network" can be used interchangeably.

Furthermore, the parameters and the like explained above can be represented by absolute values, can be expressed as relative values with respect to the predetermined values, or can be represented by any other corresponding information. For example, a radio resource can be indicated by an index.

The eNB 200 (a base station) can accommodate one or more (for example, three) cells (also called sectors). When the base station accommodates more than one cells, the entire coverage area of the base station can be divided into a plurality of smaller areas, and each of the smaller areas can provide communication services via a base station subsystem (for example, small type indoor base station RRH: Remote Radio Head).

The term "cell" or "sector" refers to a base station that executes communication service in this coverage and/or a part or the entire of the coverage area of the base station subsystem. Furthermore, the terms "base station", "eNB", "cell", and "sector" can be used interchangeably in the present description. The base station is also referred to as a fixed station, Node B, eNodeB (eNB), an access point, a femto cell, a small cell, and the like.

The UE 100 is also referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other suitable terms, depending on a person skilled in the art.

The phrase "based on" used in the present description does not mean "based only on" unless specified particularly. It can also be interpreted that the phrase "based on" means both "based only on" and "based at least on".

Furthermore, the terms "including", "comprising", and various forms thereof are intended to be inclusive, similar to "equipped with". Furthermore, the term "or" used in the present description or in the claims does not intend to indicate an exclusive disjunction.

Any reference to an element using a designation such as "first", "second", and the like used in the present description generally does not limit the amount or order of those elements. Such designations can be used in the present description as a convenient way to distinguish between two or more elements. Thus, the reference to the first and second elements does not imply that only two elements can be adopted, or that the first element must precede the second element in some or the other manner.

Throughout the present description, for example, during translation, if articles such as a, an, and the in English are added, these articles shall include plurality, unless it is clearly indicated that it is not so according to the context.

The present invention can be expressed as below. A radio communication device (UE 100 or eNB 200) according to one aspect of the present invention includes a physical layer (PHY layer), a radio resource control layer (RRC layer), an intermediate layer (MAC layer/RLC layer/PDCP layer) located between the physical layer and the radio resource control layer, and is capable of transitioning between a connected state (RRC-Connected) in the radio resource control layer and a suspended state (RRC-Suspended) in the radio resource control layer. The radio communication device includes a state controlling unit (state controlling unit 120) that controls the radio resource control layer to be in any one of the connected state and the suspended state; and an interruption processing unit (interruption processing unit 130) that initializes at least apart of states in the intermediate layer after the radio resource control layer has transitioned from the connected state to the suspended state. The state controlling unit causes the radio resource control layer to resume from the suspended state to the connected state based on the state of the intermediate layer initialized by the interruption processing unit.

In the above aspect of the present invention, the interruption processing unit can initialize a timer value and a value of a variable in the intermediate layer.

In the above aspect of the present invention, the intermediate layer can include a medium access control layer, and the interruption processing unit can initialize a random access procedure performed in the medium access control layer.

In the above aspect of the present invention, the intermediate layer can include a radio link control layer, and the interruption processing unit can initialize contents of protocol data unit processed in the radio link control layer.

In the above aspect of the present invention, the intermediate layer can include a packet data convergence protocol layer, and the interruption processing unit can initialize contents of protocol data unit processed in the packet data convergence protocol layer.

In the above aspect of the present invention, the intermediate layer can include a packet data convergence protocol layer, and the interruption processing unit can maintain a context of a header compression processed in the packet data convergence protocol layer without initializing.

A radio communication method according to another aspect of the present invention includes a physical layer, a radio resource control layer, an intermediate layer located between the physical layer and the radio resource control layer, and is capable of transitioning between a connected state in the radio resource control layer and a suspended state in the radio resource control layer. The radio communication method includes transitioning the radio resource control layer from the connected state to the suspended state; initializing at least a part of states in the intermediate layer; and causing the radio resource control layer to resume from the suspended state to the connected state based on the initialized state of the intermediate layer.

As described above, the details of the present invention have been disclosed by using the embodiment of the present invention. However, the description and drawings which constitute part of this disclosure should not be interpreted so as to limit the present invention. From this disclosure, various alternative embodiments, examples, and operation techniques will be easily apparent to a person skilled in the art.

The entire contents of Japanese Patent Application 2016-002932 (filed on Jan. 8, 2016) are incorporated in the description of the present application by reference.

INDUSTRIAL APPLICABILITY

According to the radio communication device and the radio communication method, it is possible to surely avoid a state that communication cannot be started because of a disagreement in states in an intermediate layer, which is lower to RRC layer, when transitioning between a connected state (RRC-Connected) and a suspended state (RRC-Suspended) in the RRC layer.

EXPLANATION OF REFERENCE NUMERALS 10 radio communication system
20 radio access network
100 UE
110 data transmitting-receiving unit
120 state controlling unit
130 interruption processing unit
200 eNB
300 MME

The invention claimed is:

1. A radio communication device including a physical layer, a radio resource control layer, a Radio Link Control (RLC) layer located between the physical layer and the radio resource control layer, and capable of transitioning between a connected state in the radio resource control layer and a suspended state in the radio resource control layer, the radio communication device comprising:
   a state controlling unit that controls the radio resource control layer to be in any one of the connected state and the suspended state; and
   an interruption processing unit that initializes a predetermined information among information indicating a state of the RLC layer after the radio resource control layer has transitioned from the connected state to the suspended state, wherein
   the state controlling unit causes the radio resource control layer to resume from the suspended state to the connected state in response to a request to resume the connected state,
   the predetermined information comprises a timer value and a variable value in the RLC layer that indicates a top edge and a bottom edge of a transmission window or a reception window of the RLC layer, and
   the RLC layer includes the predetermined information.

2. The radio communication device as claimed in claim 1, wherein the interruption processing unit initializes the timer value and the variable value in the RLC layer that indicates the top edge and the bottom edge of the transmission window or the reception window of the RLC layer.

3. The radio communication device as claimed in claim 1, wherein
   the RLC layer is adjacent to a medium access control (MAC) layer, and
   the interruption processing unit initializes a random access procedure performed in the MAC layer.

4. The radio communication device as claimed in claim 1, wherein
   the interruption processing unit initializes contents of protocol data unit processed in the RLC layer.

5. The radio communication device as claimed in claim 1, wherein the RLC layer is adjacent to a packet data convergence protocol layer, and the interruption processing unit initializes contents of protocol data unit processed in the packet data convergence protocol layer.

6. The radio communication device as claimed in claim 1, wherein the RLC layer is adjacent to a packet data convergence protocol layer, and the interruption processing unit maintains a context of a header compression processed in the packet data convergence protocol layer without initializing.

7. A radio communication method including a physical layer, a radio resource control layer, a Radio Link Control (RLC) layer located between the physical layer and the radio resource control layer, and capable of transitioning between a connected state in the radio resource control layer and a suspended state in the radio resource control layer, the radio communication method comprising:

transitioning the radio resource control layer from the connected state to the suspended state;

initializing a predetermined information among information indicating a state of the RLC layer; and causing the radio resource control layer to resume from the suspended state to the connected state in response to a request to resume the connected state, wherein the predetermined information comprises a timer value and a variable value in the RLC layer that indicates a top edge and a bottom edge of a transmission window or a reception window of the RLC layer, and wherein the RLC layer includes the predetermined information.

* * * * *